United States Patent [19]

Szabo

[11] Patent Number: 5,213,376
[45] Date of Patent: May 25, 1993

[54] SQUEEZE-TO-RELEASE QUICK CONNECTOR

[75] Inventor: George Szabo, Ortonville, Mich.

[73] Assignee: ITT Corporation, New York, N.Y.

[21] Appl. No.: 753,758

[22] Filed: Sep. 3, 1991

[51] Int. Cl.$^5$ .............................................. F16L 35/00
[52] U.S. Cl. ..................................... 285/39; 285/423; 285/921
[58] Field of Search ............... 285/423, 921, 38, 39

[56] References Cited

U.S. PATENT DOCUMENTS

| | | | |
|---|---|---|---|
| 3,588,149 | 6/1971 | Demler | 285/921 X |
| 3,990,727 | 2/1976 | Gallagher. | |
| 4,844,512 | 5/1988 | Gahwiler. | |
| 4,991,882 | 2/1991 | Gahwiler | 285/423 X |

*Primary Examiner*—Dave W. Arola
*Attorney, Agent, or Firm*—Robert P. Seitter; J. Gordon Lewis

[57] ABSTRACT

A squeeze-to-release quick connector for engaging a flanged male member includes a cylindrical body portion which is open at one end for receiving the male member and forms a conduit receiving adapter at its opposite end. An annular retainer ring is axially spaced from the open end and is attached to the body portion by two circumferentially opposed, generally parallel axially elongated beam members. Each beam member is affixed at one end to the retaining ring and at an opposed end to a mount located on the body portion axially spaced from the open end. Two circumferentially spaced detents extend inwardly from a retaining ring to capture the male abutment surface to effect positive engagement therebetween.

18 Claims, 2 Drawing Sheets

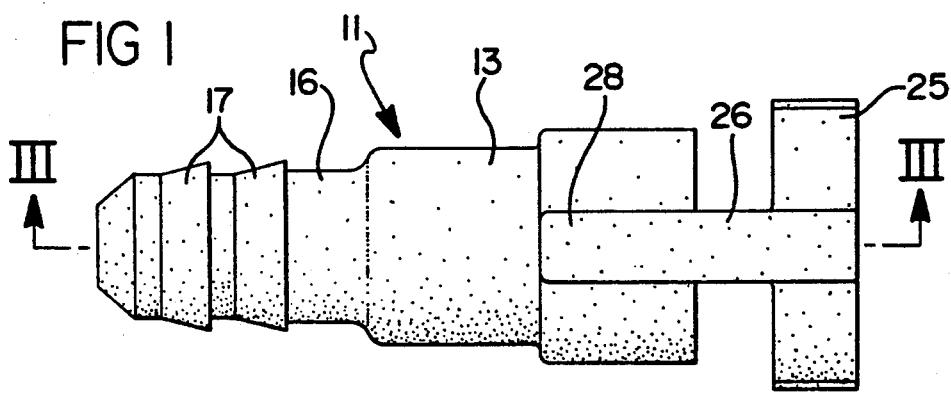
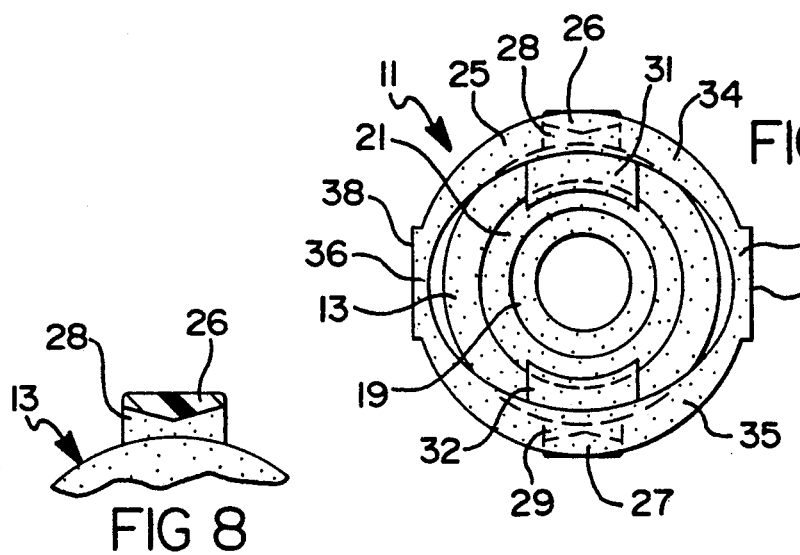
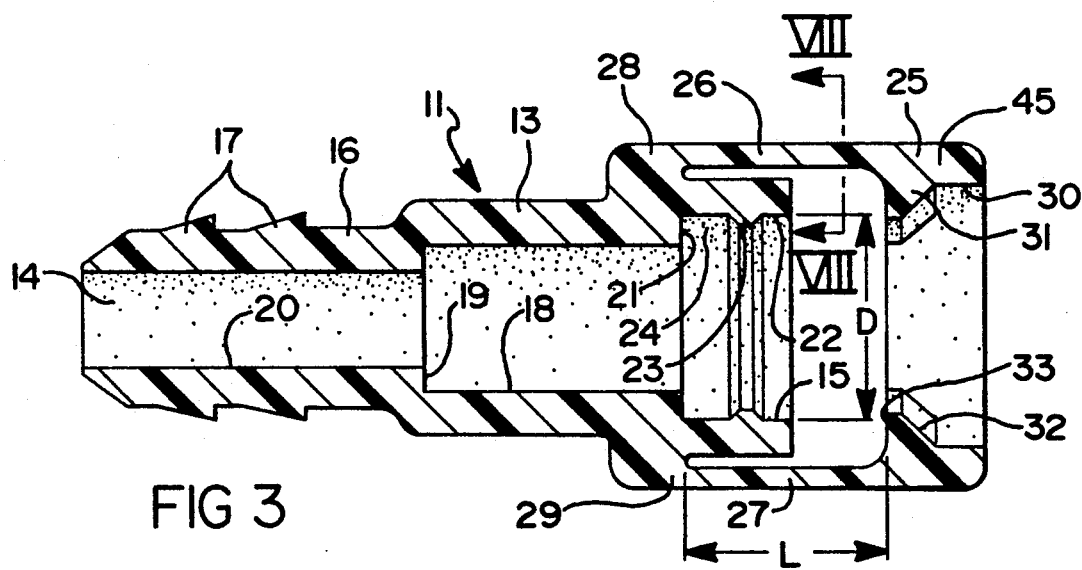

SQUEEZE-TO-RELEASE QUICK CONNECTOR

INTRODUCTION

The present invention relates to snap-fit connectors, and more particularly to such connectors which are employed in fluid conduit systems to facilitate assembly and disassembly.

BACKGROUND OF THE INVENTION

Snap-fit or quick connectors have been found to be useful in a wide range of applications. In particular, they are frequently employed for joining fluid carrying conduit in automotive and industrial applications. Such connectors have found general acceptance in as they are typically capable of being closed in a single uniaxial movement which facilitates automated assembly, and entail simple designs which are relatively inexpensive to produce.

A further advantage of quick connect fittings is that they provide an effective seal for handling volatile or hazardous fluids such as gasoline while permitting ease of disassembly and reassembly during repair of a host system. Although tools are often required to effect release of quick connect fittings, designs such as those described in U.S. Pat. Nos. 3,990,727 and 4,844,512 provide for manual release of the fitting without the necessity of separate tools. Although representing an advancement in the art, such "squeeze-to-release" designs often have certain shortcomings.

In applications where hazardous material is to flow through a fitting, prevention of inadvertent release is of primary concern. Accordingly, relatively high axial pull-apart strength specifications are mandated. In order comply with such specifications, manufactures of prior art designs typically employed material with a relatively high characteristic flex modulus (such as glass filled Nylon 12) to prevent warping or deformation of abutting locking surfaces within the connector under axial loading conditions. Unfortunately, materials with increased flex modulus are inherently stiffer and can require substantially higher release forces. A related problem is found in that the stiffer material tolerates only relatively short radial displacement of the female connector abutment surface to effect release. This provides relatively little "purchase" (or degree of radial overlap) of the mating abutment surfaces in the engaged condition, thereby exacerbating potential pull apart problems.

Lastly, known prior art designs were prone to fatigue leading to failure after a relatively small number of engagement-disengagement cycles.

BRIEF DESCRIPTION OF THE INVENTION

The present invention overcomes the above described shortcomings of the prior art by providing a connector which is suitable for long term operation, is inexpensive to manufacture, is compact and is capable of being assembled by robots. The inventive quick connector is adapted for selective locking engagement with a male member of the type including an outwardly extending abutment surface. The connector includes a generally cylindrical, elongated body portion which is open at one end for receiving the male member and has a conduit receiving adapter formed at the other end. An annular retaining ring is disposed concentrically with the body portion axially spaced from the open end and is attached thereto by two circumferentially opposed generally parallel, axially elongated beam members. Each beam member is affixed at one end to the retaining ring and at the other end to a mount located on the outside surface of the body portion axially spaced from the open end. Finally, two or more circumferentially spaced detents extend inwardly from the retaining ring which are operative to capture the abutment surface of the male member to effect positive axial engagement therebetween. This arrangement has the advantage of an inexpensive squeeze-to-release engagement mechanism for a quick connector exhibiting high pull off strength while being actuatable with relatively low release forces.

According to one aspect of the invention, the beam members extend axially a distance approximately equal to the characteristic inner diameter the body portion. This arrangement provides the advantage of achieving large radial displacement of the detents while imposing relatively little flexure induced stress on the beam members during release to enhance life of the connector. This arrangement further minimizes the chance of inadvertent decoupling due to side-impact loads.

According to another aspect of the invention, the associated male member comprises a tubular conduit with a circumferential radially outwardly extending upset located adjacent and end thereof to define the male abutment surface. This arrangement has the advantage of employing a standard male member with the inventive squeeze-to-release quick connector in contrast to prior art designs requiring elaborate shaped male members, thereby further reducing cost and complexity.

According to still another aspect of the invention, the beam members extend generally parallel to the outside surface of the body portion and are spaced slightly radially outwardly therefrom. This arrangement has the advantage of providing a relatively compact design suitable for incorporation in a close quarter environment.

These and other features and advantages of this invention will become apparent upon reading the following specification, which, along with the drawings, describes and discloses a preferred embodiment of the invention in detail.

A detailed description of the disclosed embodiment makes reference to the accompanying drawings.

BRIEF DESCRIPTION OF THE DRAWINGS

FIG. 1, is a side plan view of the preferred embodiment of a squeeze-to-release quick connector;

FIG. 2, is an end view of the connector of FIG. 1 on an enlarged scale;

FIG. 3, is a cross-sectional view taken on line III—III of FIG. 1 on an enlarged scale;

FIG. 8, is a cross-sectional view taken on line VIII—VIII of FIG. 3.

DETAILED DESCRIPTION OF THE PREFERRED EMBODIMENT OF THE INVENTION

Figure 4:
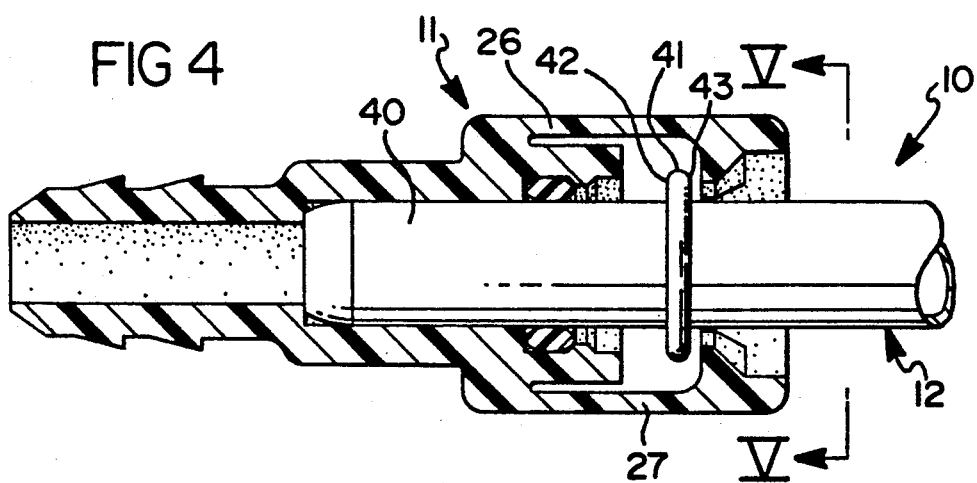
FIG. 4, is a fragmentary longitudinal cross-sectional view of the embodiment of FIG. 1 in which the connector is coupled with a mating male tube end.

Referring to the drawing Figures, a connector assembly, designated 10, embodying the present invention comprises a female connector part 11 and a male connector part 12. The present invention will be described in detail hereinbelow adapted for incorporation within a system of tubular conduits for conducting fluid flow. However, it is contemplated that in the broadest sense, the present inventive connector could be readily adapted for other applications in view of the present specification.

Referring to FIGS. 1 through 3, female connector part 11 is shown in detail. Female connector part 11 includes a generally cylindrical elongated body portion 13 having a stepped bore 14 extending therethrough concentric with the body portion axis of elongation. As best seen in FIG. 3, bore 14 exits rightwardly from body portion 13 to define an opening 15 for receiving male connector part 12. Body portion 13 transitions leftwardly into a conduit receiving adapter 16 which is generally tubular and through which bore 14 emerges leftwardly. The outer surface of adapter 16 defines two or more circumferential barbs 17 axially spaced therealong for engaging the inner diameter of a rubber or otherwise suitable conduit (now shown) in the usual manner.

A central segment 18 of stepped bore 14 is dimensioned to form a slip fit with the nominal outside diameter of male connector part 12, as best shown in FIG. 4. A radial step 19 delineates central segment 18 with a left reduced diameter segment 20 of bore 14 extending through adapter 16. Step 19 serves as an abutment surface for the leading edge of male connector part 12. A second radial step 21 delineates central segment 18 and a right increased diameter segment 22 of bore 14 which emerges rightwardly as opening 15. A radially inwardly directed circumferential retaining rib 23 is formed within bore segment 22 axially interspaced between step 21 and opening 15. The radially outermost portion of bore segment 22 intermediate step 21 and rib 23 is designated as a seal receiving recess 24. In application, it is contemplated that an annular elastic seal, such as an O-ring (see FIG. 4), would be disposed within recess 24 and retained in position by rib 23 for providing sealing engagement between bore 14 of body portion 13 and the outer diameter surface of male connector part 12.

An annular retaining ring 25 is disposed concentrically about the axis of elongation of body portion 13 and is axially spaced rightwardly (as viewed in FIG. 3) from opening 15. The degree of axial spacing between retaining ring 25 and opening 15 is not deemed critical. The two need only by separated sufficiently to ensure that ring 25 can be manipulated without interference from the adjacent end of body portion 13. In the preferred embodiment, sufficient spacing is provided to accommodate an upset or flange of male connector part 12. Retaining ring 25 is joined with the remainder of connector part 11 by two circumferentially opposed, generally parallel, axially elongated beam members 26 and 27. Beam members 26 and 27 are each joined at one end to the transverse face of retaining ring 25 nearest opening 15. The remaining ends of beam members 26 and 27 are joined to body portion 13 through intermediate respective mounting bosses 28 and 29 extending radially outwardly from body portion 13. In the preferred embodiment, beam members have a pentagon-shaped cross-section as seen in FIG. 2 and 8. Alternatively, rhombic, diamond, lozenge or similar cross-section profiles could be substituted.

Retaining ring 25 has a central opening 30 which has a characteristic diameter exceeding that of bore segment 22 for providing clearance for male connector part 12 as best viewed in FIGS. 4 through 7. Two circumferentially spaced detents extend radially inwardly from retaining ring 25 within central opening 30. Each detent is angularly aligned with one of the beam members 26, 27 (see FIG. 2) and forms a radially tapering ramp surface 32 on a side of each detent 31 facing away from opening 15 and a radially transverse abutment surface 33 on a side thereof facing opening 15. Detents 31 extend radially inwardly within central opening 30 such as to have a diametrical spacing therebetween which is greater than the diameter of bore segment 18 and slightly less than the diameter of bore segment 22 which, as viewed in FIG. 3, is designated D. Beam members 26 and 27 extend an axial length designated L between retaining ring 25 and mounting bosses 28 and 29, respectively. As will be described in detail hereinbelow, in the preferred embodiment of the invention, dimensions D and L are generally equal. To achieve this result, mounting bosses 28 and 29 are axially positioned intermediate opening 15 and adapter 16, preferably axially coextensive with radial step 21 of body portion 13. Such positioning provides a substantially rigid base for mounting beam members 26 and 27 which is well spaced axially leftwardly from opening 15 to permit distention of retaining ring 25, as will be described in detail hereinbelow without distortion of the open end of body portion 13. Furthermore, beam members are spaced radially outwardly of and generally parallel to (in the relaxed condition) body portion 13, and transition into bosses 28, 29 and retaining ring 25 through contoured tapers to avoid abrupt transitions which can create stress raisers.

As best seen in FIG. 2, retaining ring 25 is provided with a specific profile in the transverse plane to enhance its advantageous operation as described herein. Although described as generally annular in shape, retaining ring 25 is preferably formed from upper and lower crescent portions 34 and 35 joined at the ends thereof through web members 37 and 38. The thickest section of crescent portions 34 and 35 is formed in the circumferential center thereof to positionally coincide or angularly align with beam members 26 and 27, respectively. Web members 36 and 37 are locally thickened to provide relatively flat grip surfaces 38 and 39, respectively, which can be serrated or dimpled to enhance their gripworthiness.

The entire female connector part 11 is preferably injection molded as a single homogeneous piece from suitable material such as Nylon 66 unfilled. Although many materials would be suitable for practicing the present invention, Nylon 66 has been found to be particularly advantageous in certain automotive applications. When the retaining ring 25 is configured as described hereinabove, the portions thereof adjacent beam members 26 and 27 are relatively stiff while web members 36 and 37 are relatively compliant. Thus, connector assembly 10 can be released to enable uniaxial separation of female connector part 11 and male connector part 12 simply by grasping and squeezing together of grip surfaces 38 and 39. The crescent-shape configuration furthermore provides for greater travel of web members 36 and 37 from their illustrated relaxed position in which detents 31 engage the male connector part 12 to a release condition in which detents 31 are momentarily radially displaced outwardly to effect release of the male connector part 12. This configuration has been found to provide substantially easier release of the connector assembly 10 as compared to prior art approaches involving release rings with uniform diameter and/or cross-sectional area.

Figure 5:
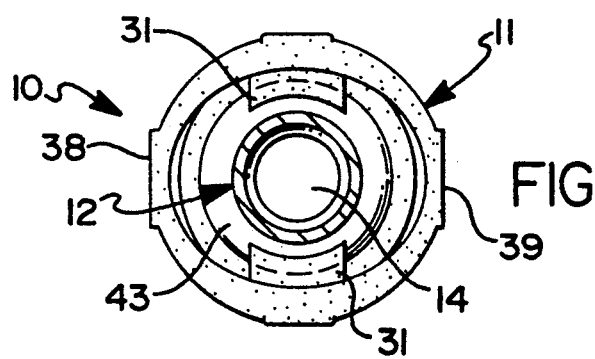
FIG. 5, is a cross-sectional view taken on line V—V of FIG. 4.

Referring to FIGS. 4 and 5, female and male connector parts 11 and 12 are illustrated in the engaged position. In the preferred embodiment of the invention, male connector part 11 is a standard tube end with an upset or radially outwardly extending circumferential ridge formed therein adjacent and end which is matingly received within bore 14 connector part 11. Specifically, male connector part 12 includes a leading end 40 with a conventional upset 41 positioned slightly rearwardly therefrom. The leading edge of upset 41 comprises a ramp surface 42 and the trailing edge thereof comprises an abutment surface 43. Prior to locking engagement illustrated in FIG. 4, male connector part 12 engages female part 11 whereby ramp surface 42 engages ramp surface 32 of detents 31 to momentarily distend retaining ring 25 until upset 41 passes leftwardly of abutment surface 33. Thereafter, the natural resiliency of the material of retaining ring 25 causes it to reassume its original shape whereinafter removal of male part 12 is prevented by engagement of abutment surfaces 33 and 43.

Figure 6:
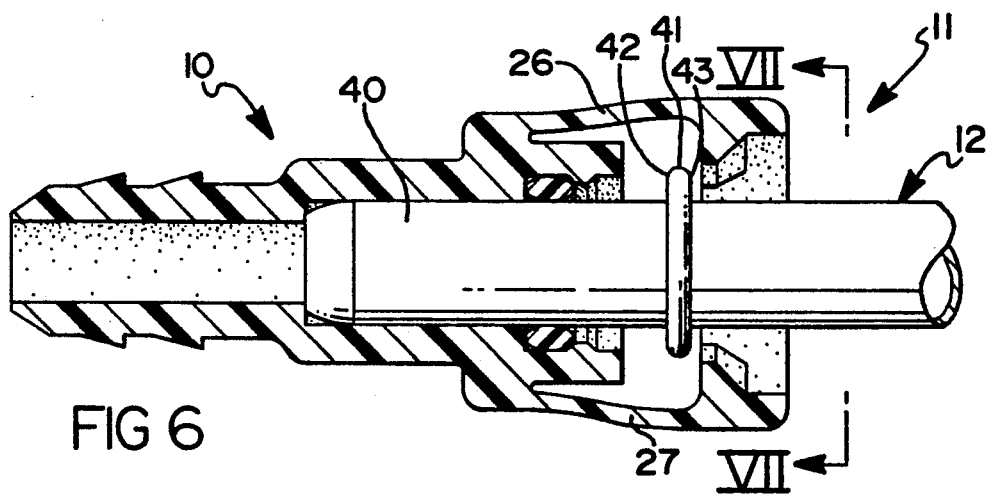
FIGS. 6 and 7, correspond to FIGS. 4 and 5, respectively, but with the connector in a release position.
Figure 7:
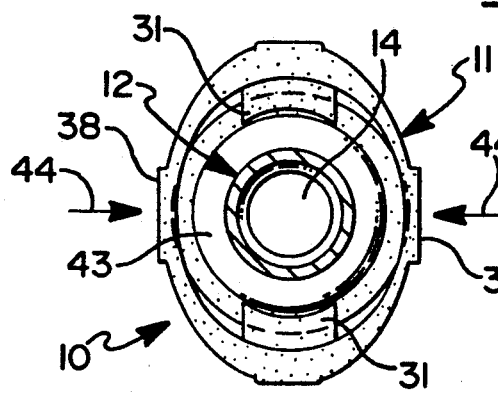

Connector assembly 10, is decoupled by the application of fingertip pressure radially inwardly at gripping surfaces 38 and 39 as illustrated by arrows 44 in FIG. 7. As described hereinabove, the application of such pressure distends retaining ring 25, causing detents 31 to move radially outwardly as best seen in FIG. 6. Once the innermost portion of detents 31 is positioned radially outwardly of upset 41, male connector part 12 can be decoupled from female connector part 11 by axially withdrawing it in the usual manner.

A principle advantage of the present invention lies in the provision of beam members 26 and 27 in that the respective ends thereof find relatively rigid support in either the thickest sectioned area of the retaining ring 25 or the mounting boss 28, 29. This permits distention of retaining ring 25 from the configuration shown in FIGS. 4 and 5 to the configuration shown in FIGS. 6 and 7 with the application of relatively little effort by the user while, simultaneously, maintaining structural rigidity both at the opening 15 as well as the circumferential positioning of detents 31. This represents a substantial improvement over known prior art designs which either are so rigid as to make release extremely difficult and require the exercise of large effort or, so flimsy that the detents tend to self-rotate in distortion and not release the male part. Such self-rotation can be envision by a slight rotation of each detent 31, causing a corner of each abutment surface 33 to remain engaged with abutment surface 42 of male part 12. The propensity of such circumferential distortion is substantially reduced with the present design. Furthermore, many prior art designs tend to have large inherent stress risers, resulting in premature fracture failures. The provision of relatively long beam members 26 and 28 in the present invention, distributes the forces of distention along the beam and significantly reduces the likelihood of failure while permitting great design flexibility in material selection for specific applications.

A circumferential skirt 45 extends axially outwardly from detents 31 to serve as a guide for leading end 40 of male part 12 during the insertion process, as well as permitting use of a reduced overall wall thickness in retaining ring 25 to further enhance ease of decoupling without degrading pull-apart strength.

It is to be understood that the invention has been described with reference to a specific preferred embodiment which provides the features and advantages previously discussed and that such embodiment is susceptible of modification as will be apparent to those skilled in the art. For example, any number of beam member configurations will be apparent in view of this specification. In the broadest sense definitionally, a beam member is deemed to be any structure that functions as a load disturbing beam subjected primarily to bending rather than tension and compression which is connected at one point to the body portion and at another point to the retaining ring. Accordingly, the foregoing is not to be construed in a limiting sense.

What is claimed is:

1. A squeeze-to-release quick connector adapted for selective locking engagement with a male member defining an outwardly extending abutment surface, said quick connector comprising:
   a generally cylindrical, elongated body portion open at one end for receiving said male member and forming a conduit receiving adapter at an opposite end;
   an annular retaining ring disposed concentrically with said body portion axially spaced from said open end;
   two circumferentially opposed, generally parallel, axially elongated beam members interconnecting said retaining ring and body portion, each said beam member affixed at one end thereof to said retaining ring and at an opposed end thereof to a mount located on said body portion axially spaced from said open end such that said beam members are radially spaced from said body portion; and
   at least two circumferentially spaced detents extending inwardly from said retaining ring to capture said abutment surface to effect positive engagement of said quick connector and male member, said retaining ring being adapted to be squeezed at angularly offset locations from said beam members to release said abutment surface from said detents for removal of said male member.

2. The quick connector of claim 1, wherein said mounts extend radially outwardly from the outside surface of said body portion.

3. The quick connector of claim 1, wherein said mounts are disposed approximately axially midway between the ends said body portion.

4. The quick connector of claim 1, wherein said mounts are axially disposed from said open end by a dimension that is approximately equal to one half the inner diameter of said body portion.

5. The quick connector of claim 1, wherein said beam members extend axially a distance approximately equal to the inner diameter of said body portion.

6. The quick connector of claim 1, wherein body portion, conduit receiving adapter, retaining ring and beam members are integrally formed.

7. The quick connector of claim 6, wherein said female part is formed of injection molded plastic.

8. The quick connector of claim 1, wherein said retaining ring defines two circumferentially opposed gripping surfaces adapted to be squeezed to effect said release on an outer surface thereof angularly offset from said beam members by approximately 90 degrees.

9. The quick connector of claim 1, wherein said retaining ring and beam members are constructed of resilient material.

10. The quick connector of claim 1, wherein said detents are substantially angularly aligned with said beam members.

11. The quick connector of claim 1, wherein each said detent comprises a radially tapered ramp surface facing away from said body portion and an abutment surface facing toward said body portion.

12. The quick connector of claim 11, wherein said retaining ring includes a skirt portion axially extending away from body portion.

13. The quick connector of claim 1, wherein said beam members extend generally parallel to the outside surface of said body portion.

14. The quick connector of claim 1, wherein said male member abutment surface comprises an annular upset flange formed near one end of said male member.

15. The quick connector of claim 1, wherein said retaining ring has a cross-sectional area which varies from a maximum positionally coinciding with said beam members to a minimum offset approximately 90 degrees therefrom.

16. The quick connector of claim 1, wherein said retaining ring comprises two opposed crescent shaped sectors joined at areas of minimum cross-section.

17. A squeeze-to-release quick connector assembly comprising:
a generally tubular male part defining an outwardly extending abutment surface; and
a female part including a generally cylindrical elongated body portion open at one end for receiving said male part and forming a conduit receiving adapter at an opposite end, said female part further including an annular retaining ring disposed concentrically with said body portion axially spaced from said open end, said retaining ring joined to said body portion by two circumferentially opposed parallel, axially elongated beam members, each member affixed at one end thereof to said retaining ring and at an opposed end thereof to a mount located on said body portion axially spaced from said open end such that said beam members are radially spaced from said body portion, said ring defining two circumferentially spaced inwardly extending detents operative to engage said abutment surface to effect interlocking of said male and female parts, said retaining ring being adapted to be squeezed at angularly offset locations from said beam members to release said abutment surface from said detents for removal of said male part.

18. A squeeze-to-release quick connector comprising:
a generally cylindrical body portion open at one end for receiving a male member;
a substantially annular retaining ring disposed concentrically with said body portion axially spaced from said open end;
at least one beam member interconnecting said retaining ring and a mount carried by said body portion axially spaced from said open end such that said beam members are radially spaced from said body portion; and
detent means carried by said retaining ring operative to capture an engagement surface on said male member in a relaxed condition and displaceable upon elastic distention of said retaining ring to release said male member, said retaining ring being adapted to be squeezed at angularly offset locations from said beam members to release said abutment surface from said detents for removal of said male member.

* * * * *